(12) United States Patent
Sato

(10) Patent No.: US 9,150,319 B2
(45) Date of Patent: Oct. 6, 2015

(54) CIGARETTE INSPECTION DEVICE FOR INSPECTING THE NUMBER OF CIGARETTES IN CIGARETTE PACK

(71) Applicant: JAPAN TOBACCO INC., Tokyo (JP)

(72) Inventor: Jun Sato, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 109 days.

(21) Appl. No.: 13/932,092

(22) Filed: Jul. 1, 2013

(65) Prior Publication Data

US 2013/0287285 A1 Oct. 31, 2013

Related U.S. Application Data

(63) Continuation of application No. PCT/JP2011/057350, filed on Mar. 25, 2011.

(51) Int. Cl.
| | |
|---|---|
| *G06K 9/00* | (2006.01) |
| *B65B 57/00* | (2006.01) |
| *A24C 5/34* | (2006.01) |
| *B65B 19/32* | (2006.01) |
| *G06T 7/00* | (2006.01) |

(52) U.S. Cl.
CPC ............... *B65B 57/00* (2013.01); *A24C 5/3412* (2013.01); *B65B 19/32* (2013.01); *G06T 7/0004* (2013.01); *G06T 2207/30128* (2013.01)

(58) Field of Classification Search
None
See application file for complete search history.

(56) References Cited

U.S. PATENT DOCUMENTS

| | | | |
|---|---|---|---|
| 4,502,261 A | 3/1985 | Zullo | |
| 5,223,915 A | 6/1993 | Neri | |
| 5,979,140 A | 11/1999 | Focke et al. | |
| 6,531,693 B1 * | 3/2003 | Focke et al. | 250/221 |

FOREIGN PATENT DOCUMENTS

| | | |
|---|---|---|
| EP | 1 207 106 A1 | 5/2002 |
| JP | 2003-153679 A | 5/2003 |
| JP | 3437753 B2 | 8/2003 |
| JP | 2010-33262 A | 2/2010 |

* cited by examiner

*Primary Examiner* — Thomas Conway
(74) *Attorney, Agent, or Firm* — Birch, Stewart, Kolasch & Birch, LLP

(57) ABSTRACT

A cigarette inspection device designed to obtain an image showing filter end faces of a bundle C of filtered cigarettes arranged side by side with their axes parallel to one another, analyze the image and determine whether the bundle is short of filtered cigarettes comprises a first determination section which determines how many filtered cigarettes are arranged side by side from contours of filter end faces in the image generated, and determines whether the bundle consists of a predetermined number of filtered cigarettes, and a second determination section which determines whether the first determination section has falsely recognized one cigarette as two.

7 Claims, 7 Drawing Sheets

CIGARETTE INSPECTION DEVICE FOR INSPECTING THE NUMBER OF CIGARETTES IN CIGARETTE PACK

CROSS-REFERENCE TO RELATED APPLICATIONS

This application is a continuation of PCT International Application No. PCT/JP2011/057350 filed on Mar. 25, 2011, which is hereby expressly incorporated by reference into the present application.

TECHNICAL FIELD

The present invention relates to a cigarette inspection device capable of reliably detecting a shortage of cigarettes in a bundle of filtered cigarettes.

BACKGROUND ART

Filtered cigarettes are made into bundles of a predetermined number (twenty, for example) and packaged by a packaging machine as disclosed in patent document 1, thereby formed into finished products called cigarette packs. For example, the packaging machine disclosed in patent document 1 is applied to a bundle formed by stacking a plurality of rows of filtered cigarettes arranged side by side with their axes parallel to one another, and packages such bundle by wrapping a wrapper around the bundle and then folding the wrapper inward to close the opposite open ends of the wrapper, thus sealing the open ends.

PRIOR ART DOCUMENT

Patent Document

Patent Document 1: JP 3437753 B

SUMMARY OF THE INVENTION

Problems to be Solved by the Invention

Generally, cigarette packs includes twenty cigarettes which form a bundle consisting of three stacked rows of seven, six and seven filtered cigarettes arranged side by side. Such a bundle is supplied to a packaging machine, by which the bundle is packaged in a wrapper to produce a cigarette pack. During this process, the bundle of filtered cigarettes arranged side by side with their axes parallel to one another is inspected by an image inspection device. Specifically, the image inspection device takes an image showing filter end faces of the bundle and analyzes the obtained image to determine how many filtered cigarette are included in the bundle. Although very rare, there can be cases in which a bundle C of nineteen filtered cigarettes, with six, or one less the predetermined number of cigarettes in the bottom row, is placed into a mandrel of the packaging machine.

Further, there are cases in which due to incompleteness of the inspection algorithm that the imaging inspection device carries out, it is determined that the bundle includes the predetermined number of cigarettes although the bundle is one short of the predetermined number. Specifically, when the image inspection device uses a pattern-search inspection algorithm, which is the most widely-used algorithm for image inspection, it is possible that the image inspection device falsely recognizes one object as two. Even though most pattern-search inspection algorithms include processing to avoid such duplicative recognition, such as neighborhood removal processing, duplicative recognition still may happen.

It is conceivable to replace the pattern-search inspection algorithm by a more reliable inspection algorithm. However, introducing a new inspection algorithm to the inspection system in use or replacing the image inspection device by a new one entails a long-term shutdown of the cigarette pack factory and takes a lot of costs. There is however an urgent demand to guarantee the quality of cigarette packs by removing bundles short of filtered cigarettes from the packaging process.

The present invention provides a cigarette inspection device which can reliably detect a shortage of filtered cigarettes in bundles of cigarettes by determining whether duplicative recognition of filtered cigarettes has happened, to reliably guarantee the quality of cigarette packs.

Means for Solving the Problems

The present invention provides a cigarette inspection device designed to obtain an image showing filter end faces of a bundle of filtered cigarettes arranged side by side with their axes parallel to one another, analyze the image and determine whether the bundle is short of filtered cigarettes, comprising: a first determination section which determines how many filtered cigarettes are arranged side by side from contours of filter end faces in the image obtained, and determines whether the bundle consists of a predetermined number of filtered cigarettes, and a second determination section which determines whether the first determination section has falsely recognized one cigarette as two. The second determination section obtains gravity center positions on filter end faces in the image, and determines whether the first determination section has falsely recognized one cigarette as two, on the basis of distances between gravity center positions on adjacent filter end faces.

Desirably, the cigarette inspection device is designed to inspect a bundle formed of a plurality of alternately stacked rows of n filtered cigarettes and (n−1) filtered cigarettes, the filtered cigarettes being arranged side by side with their axes parallel to one another in each of the rows, wherein the second determination means determines whether the first determination means has falsely recognized one cigarette as two, on a row-by-row basis.

Desirably, the second determination means determines whether the first determination means has falsely recognized one cigarette as two, only when the first determination means has determined that the bundle consists of the predetermined number of filtered cigarettes.

Advantageous Effects of the Invention

The present invention is designed to not only determine how many filtered cigarettes are included in a bundle, from contours of filter end faces in the image of the bundle obtained to show filter end faces, but also determine whether duplicative recognition of cigarettes has happened. Such double-checking enables reliable detection of a shortage of cigarettes.

The present invention may be designed to obtain gravity center positions on filter end faces in the image, and determine whether duplicative recognition has happened on the basis of distances between gravity center positions on adjacent filter end faces, specifically determine that duplicative recognition has happened when a difference between the largest and the smallest of the distances between gravity center positions is greater than or equal to a preset criterion value. The image used for this determination may be an image showing filter end faces which is generated for use in determining, for example whether the filter end faces are soiled or not, when the bundle is supplied to the packaging machine. The present invention thus easily realizes a cigarette inspection device having high reliability of detecting abnormal cigarette bundles.

The present invention may be designed to inspect a bundle formed of a plurality of alternately stacked rows of n filtered cigarettes and (n−1) filtered cigarettes, the filtered cigarettes being arranged side by side with their axes parallel to one another in each of the rows, by determining whether duplicative recognition has happened, on a row-by-row basis. The inspection can thus be carried out easily and efficiently.

The present invention may be designed to determine whether duplicative recognition has happened, only when the bundle has passed the shortage inspection based on contours of filter end faces. Removing those bundles which have not passed the shortage inspection from the determination of duplicative recognition increases the ease and efficiency of inspection.

MODE FOR CARRYING OUT THE INVENTION

Figure 1:
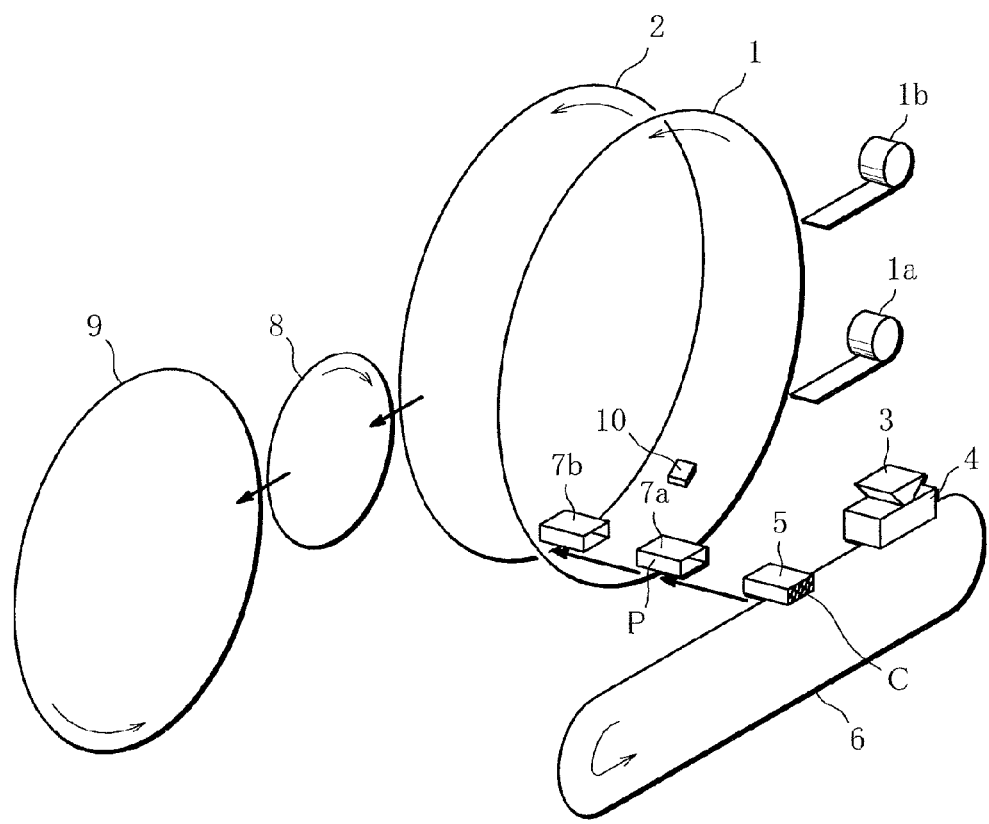
FIG. 1 is a diagram schematically showing the configuration of a cigarette pack packaging machine in which a cigarette inspection device according to the present invention is incorporated.

As shown in FIG. 1, a cigarette bundle C is formed of a plurality, for example twenty of cigarettes arranged side by side with their axes parallel to one another. The bundle C is fed to a packaging machine, by which the cigarette bundle C is packaged in a wrapper. The packaging machine comprises a forming turret 1 and a sealing turret 2 arranged coaxially and parallel to the forming turret 1. The forming turret 1 forms wrapping materials into a wrapper P in the shape of a bottomed rectangular tube. The sealing turret 2 receives a cigarette bundle C into the wrapper P and seals the wrapper P by folding the wrapper P to close the open end of the wrapper P.

Specifically, each cigarette bundle C is formed by twenty filtered cigarettes, which are fed to a hopper 3 with their filters on the same side, and then formed into three stacked rows of, for example seven, six and seven filtered cigarettes arranged side by side, by an alignment machine 4. The cigarette bundle C thus formed is placed in a transport pocket 5 and transported to the forming turret 1 by a chain conveyor 6, then pushed out of the transport pocket 5 by a plunger, not shown, into a wrapper P formed by the forming turret 1, and then, transferred into one of sealing mandrels 7b arranged along the orbit of the sealing turret 2.

The sealing turret 2 turns together with the mandrels 7b, during which the wrapper P enclosing the cigarette bundle C is sealed by being folded inward to close the open end portion, so that the packaging of the cigarette bundle C is completed. The packaged cigarette bundle C, or in other words, cigarette pack is transferred from the sealing turret 2 to a drying turret 9 via a transport turret 8, dried on the drying turret 9, and then, delivered as a finished product.

From wrapping material supply devices 1a, 1b arranged along the circumference of the forming turret 1, an inner wrapper Pa, such as a sheet coated with vapor-deposited aluminum film, and an outer wrapper Pb, such as a sheet of paper, are supplied to each of packaging mandrels 7a arranged along the orbit of the forming turret 1. The inner wrapper Pa and the outer wrapper Pb are wrapped around the packaging mandrel 7a, one on the other, to form a bottomed rectangular tube-shaped wrapper P.

The cigarette inspection device according to the present invention takes an image showing filter end faces of the cigarette bundle C, with a camera 10 arranged beside the orbit of the sealing turret 2, before the packaging of the cigarette bundle in a wrapper P is completed, and analyzes the obtained image showing filter end faces to determine their quality, specifically whether they are soiled or not.

The camera 10 imaging the cigarette bundle is located slightly downstream of the sealing mandrel 7b in the direction of transfer of the cigarette bundle C packaged in the wrapper P from the packaging mandrel 7a to the sealing mandrel 7b, to take an image showing filter end faces of the cigarette bundle C, just before the wrapper P is folded inward to close the open end portion of the wrapper P.

Figure 2:
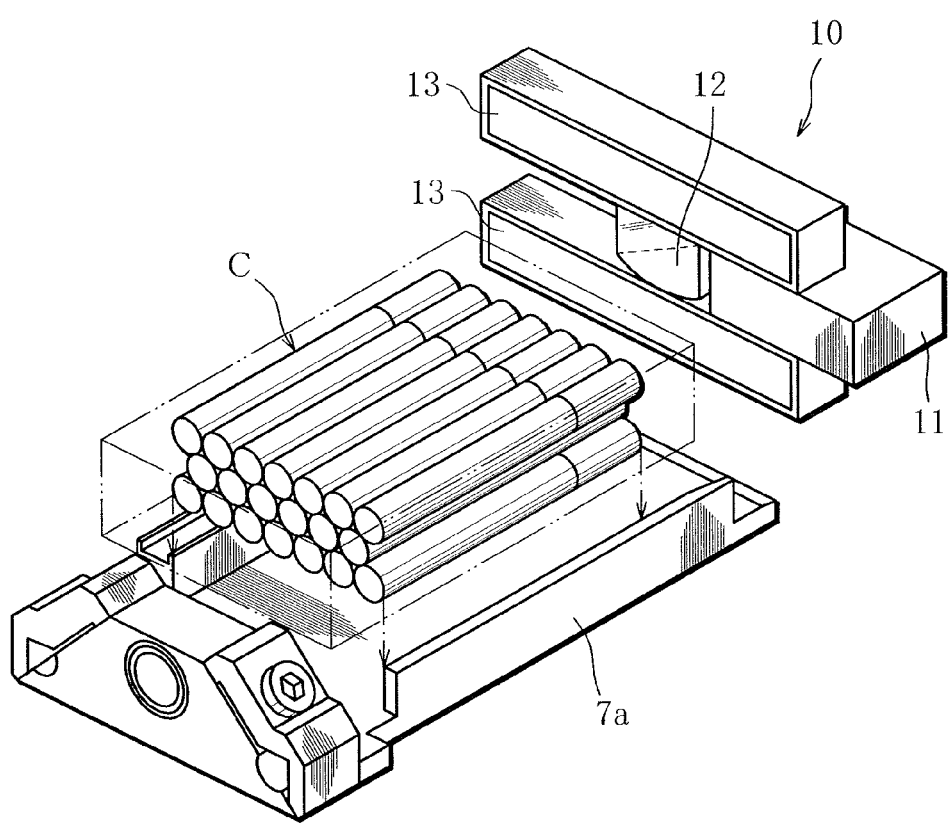
FIG. 2 is a diagram showing in what state a bundle of filtered cigarettes is fed to the cigarette pack packaging machine and the relationship between the bundle and a camera obtaining an image showing filter end faces of the bundle.

As seen in FIG. 2, the camera 10 is a slim side-view type camera including an optical system 12 having a prism or the like attached to the front of a camera body 11 and capable of imaging in the direction normal to its longitudinal direction. Over and under the camera body 11, strobes 13, 13 are arranged to illuminate the direction of imaging. The strobes 13, 13 each have a minute illuminator such as an LED. Such miniature camera 10 can be arranged in a space between the forming turret 1 and the sealing turret 2. The camera 10 can thus take an image showing filter end faces of the cigarette bundle C placed in the sealing mandrel 7b of the sealing turret 2, before the wrapper P is sealed.

Figure 3:
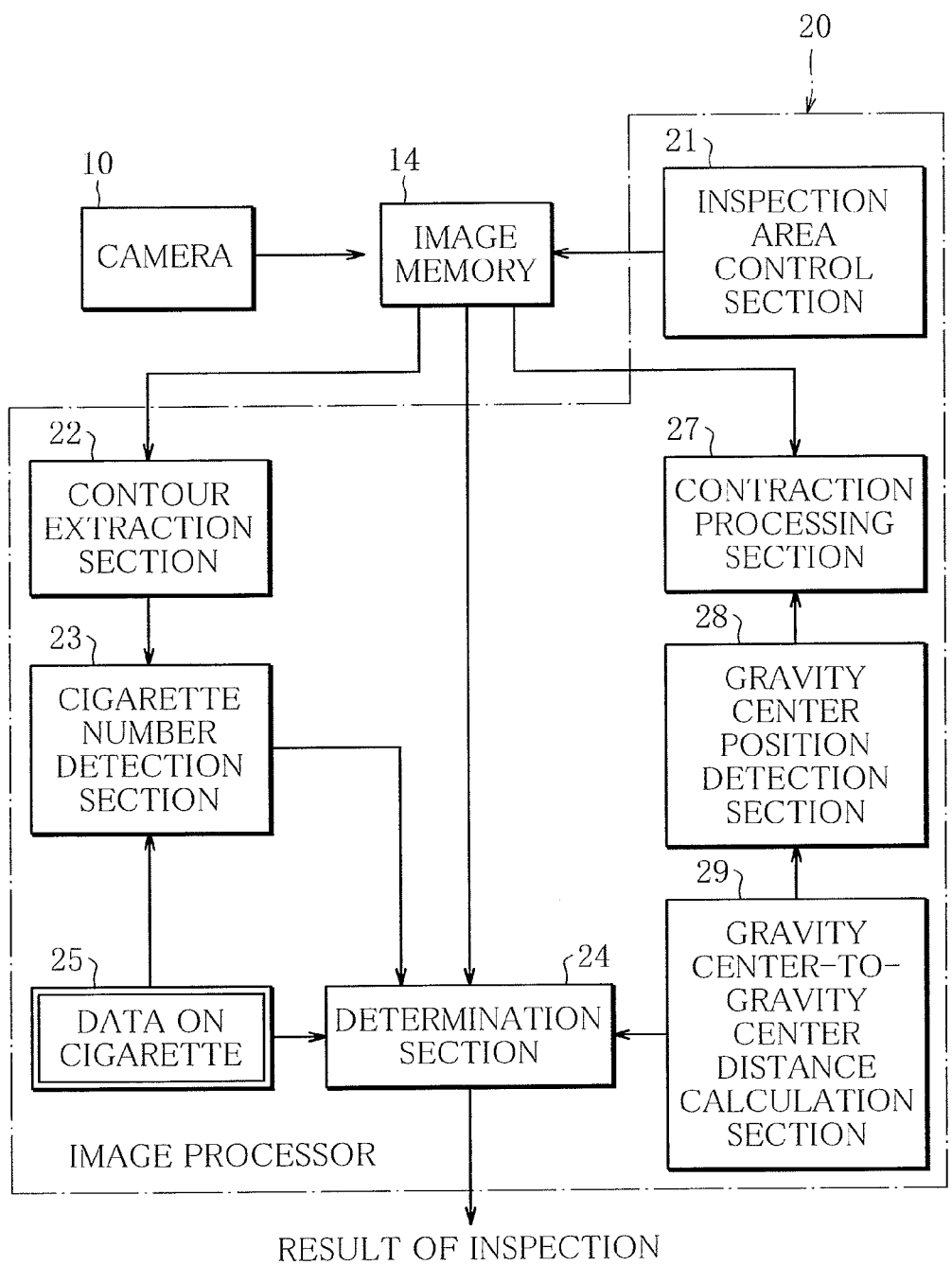
FIG. 3 is a diagram showing the system configuration of the cigarette inspection device according to the present invention.

FIG. 3 schematically shows a system configuration of the cigarette inspection device according to the present invention. The cigarette inspection device comprises an image memory 14 for storing an image showing filter end faces of a to-be-inspected cigarette bundle C, the image being took with the camera 10, and an image processor 20 for analyzing the image of the to-be-inspected cigarette bundle stored in the image memory 14 (image showing filter end faces of the cigarette bundle C). The image processor 20 is, for example a microprocessor configured to analyze the image of the to-be-inspected cigarette bundle according to preset programs. The image of the to-be-inspected cigarette bundle C obtained with the camera 10 includes bright regions resulting from the filter end faces of cigarettes, which are, for example white in basic color, illuminated by the strobes 13, 13, and dark regions resulting from spaces between and beside the cigarettes, which do not reflect light.

Next, the image processor 20 will be described in detail.

The image processor 20 determines whether the cigarette bundle C is formed of three stacked rows of seven, six and seven cigarettes arranged side by side, through processing such as contour extraction processing, color detection processing, and filter end-face gravity center position detection processing, which will be described later, and then, determines whether there is a shortage of cigarettes in the bottom row of the cigarette bundle, for example.

Specifically, the image processor 20 determines whether the bottom row of the cigarette bundle C consists of six cigarettes, or in other words, whether the bottom row is one cigarette short of the predetermined number.

To this end, the image processor 20 comprises an inspection area control section 21, a contour extraction section 22, a cigarette number detection section, a determination section (first and second determination means) 24, a contraction processing section 27, a gravity center position detection section 28, a gravity center-to-gravity center distance calculation section 29.

Figure 4:
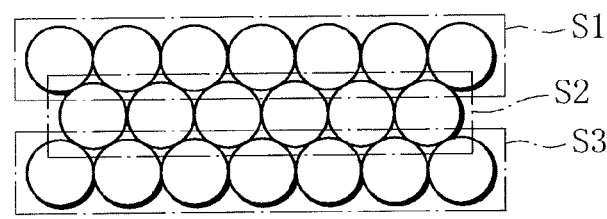
FIG. 4 is an example of how search areas are set on the image of a to-be-inspected bundle.

The inspection area control section 21 sets inspection areas, and reads only the inspection areas of the image of the to-be-inspected cigarette bundle from the image memory 14. For example, in FIG. 4, search areas S1, S2, S3 are set on the image of the to-be-inspected cigarette bundle, as inspection areas, to encompass filter end faces in the top, middle and bottom rows of seven, six and seven cigarettes arranged side by side with their axes parallel to one another, respectively.

The contour extraction section 22 detects contours of filter end faces in the top, middle and bottom rows, on a row-by-row basis, by searching the search areas S1, S2, S3 set on the image of the to-be-inspected cigarette bundle, on an area-by-area basis, using a pattern slightly greater than the filter diameter φ.

The cigarette number detection section 23 obtains the number of cigarettes constituting each row by determining how many contours of filter end faces are recognized in each row in the image. Normally, the contours of filter end faces form a series of circles of a specified diameter connected to one another. The numbers of cigarettes constituting the top, middle and bottom rows, respectively, obtained from the search areas S1, S2, S3, respectively, are transmitted to the determination section 24.

The determination section 24 determines whether each row consists of a predetermined number of cigarettes, or in other words, whether there is a shortage of cigarettes in each row, on the basis of data on cigarette bundle C, stored in the memory 25 in advance. If, for example, the number of cigarettes detected in the bottom row is six so that nineteen cigarettes in all are detected in the bundle, the determination section 24 immediately determines that the bundle is short of cigarettes, and thus abnormal. This shortage determination is performed on not only the bottom row but also the top and middle rows. The section performing this shortage determination is referred to as a first determination means of the present invention.

The contraction processing section 27 performs contraction processing on the whole image of the to-be-inspected cigarette bundle or the search areas S1, S2, S3 thereof, on an area-by-area basis. The contraction processing is pre-processing performed prior to detecting a gravity center position on each filter end face in the image of the to-be-inspected cigarette bundle C, by which filter end faces are contracted (reduced in size) in the image of the to-be-inspected cigarette bundle.

Figure 5:
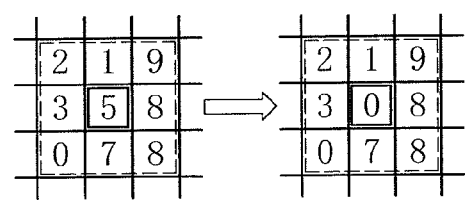
FIG. 5 is a diagram showing the concept of contraction processing performed on the image.

Specifically, the contraction processing section 27 scans the whole image of the to-be-inspected cigarette bundle or each of the search areas S1, S2, S3 thereof, pixel by pixel, where for each pixel, its value (brightness) of the target pixel is compared with the values of the pixels surrounding the target pixel, specifically eight pixels forming a 3×3 array together with the target pixel as shown in FIG. 5, and replaced by the smallest of the 3×3 pixel values (lowest brightness). The brighter (whiter) a point in the image, the greater value the corresponding pixel has. The darker (blacker) a point in the image, the smaller value the corresponding pixel has. In sum, the contraction processing scans the whole image of the to-be-inspected cigarette bundle or each of the search areas thereof, pixel by pixel, and replaces the value of each pixel by the smallest value among the pixels surrounding the target pixel if the value of the target pixel is greater the smallest value. By this, the pixels originally representing a boundary region of each filter end face are darkened to values representing the background, so that each filter end face is contracted in the image.

Let us suppose that the brightness of each pixel is represented in ten levels from "0" for black to "9" for white. If a 3×3 array of pixels has values "2, 1, 9, 3, 5, 8, 0, 7, 9" from top left to bottom right as shown in FIG. 5, the value "5" of a target pixel compared with the surrounding eight pixels is replaced by the smallest value "0" in the 3×3 array. By conducting such replacement for every pixel in the image or each search area thereof successively, the brightness values of those pixels originally representing the boundary region of each filter end face are lowered, so that they have now such low brightness values as representing the background. Thus, in each search area of the image, the filter end faces are contracted. If the replacement is conducted such that the value of each pixel is replaced by the greatest value among the surrounding pixels, the filter end faces in each search area of the image are expanded.

Figure 6:
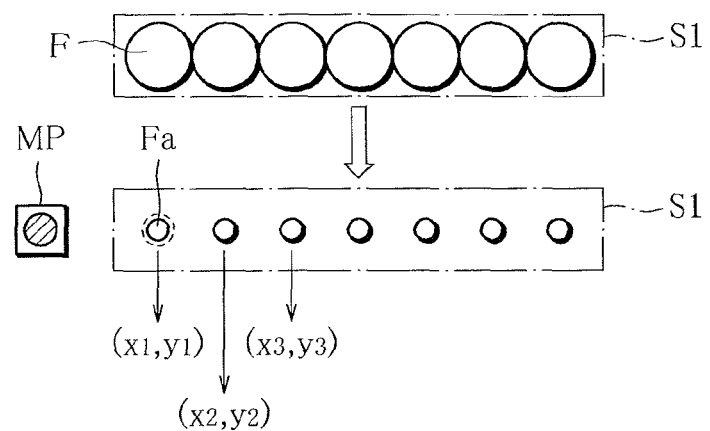
FIG. 6 is a diagram showing an example of gravity center positions on filter end faces detected in the contraction-processed image.

The contraction processing is repeated, for example on the search areas S1, S2, S3, on an area-by-area basis, until the filter end faces F in the image are contracted to a predetermined size. Thus, in each of the search areas S1, S2, S3 of the image, the filter end faces (portions having high brightness) Fa resulting from contraction of the filter end faces F are separated from one another, as shown in FIG. 6. It is to be noted that the position of (gravity center position on) each filter end face F in each search area S1, S2, S3 of the image remains unchanged although the contraction processing lowers the brightness of those pixels which represent a boundary region of each filter end face, or high-brightness portion, to a level representing the background.

The gravity center position detection section 28 obtains a gravity center position of each cigarette on its filter end face in the contraction-processed image of the cigarette bundle C. The gravity center position is detected, for example by pattern matching using a mask pattern (reference pattern) MP of a specified size, as shown in FIG. 6. The mask pattern MP for use in the pattern matching is, for example slightly greater in size than the filter end face Fa in the contraction-processed image. The gravity center position detection section 28 scans each of the search areas S1, S2, S3 to check the image against the mask pattern MP, where a gravity center position [x, y] on each filter end face Fa in the contraction-processed image is obtained as the position of the mask pattern MP encompassing the filter end face Fa just now.

After the gravity center position of each cigarette on its filter end face is obtained as described above, the gravity center-to-gravity center distance calculation section 29 obtains one-dimensional distances between the gravity center positions of adjacent cigarettes in the rows, particularly in the bottom row. The distances between the gravity center positions of the adjacent cigarettes in the bottom row, obtained by the gravity center-to-gravity center distance calculation section 29, are transmitted to the determination section 24.

Of the distances between the gravity center positions on filter end faces of adjacent cigarettes in the bottom row, the determination section 24 obtains the largest and smallest distances as the maximum and minimum values Dmax, Dmin of gravity center-to-gravity center distance D, and determines whether or not the difference [Dmax−Dmin] between these maximum and minimum values is greater than or equal to a preset criterion value Ds. The criterion value Ds is preset to be slightly smaller than the filter diameter φ which is known; it is, for example Da-De, where Da is an average of the distances D between gravity center positions of adjacent cigarettes, and De is the greatest error assumed in the distances between gravity center positions.

If the difference [Dmax−Dmin] is greater than or equal to the criterion value Ds, it is determined that one cigarette in the bottom row has falsely be recognized as two, or in other words, duplicative recognition has happened, and that the bundle is abnormal (short of cigarettes). This determination is performed on those cigarette bundles C which have passed the aforementioned shortage inspection based on the contours of filter end faces, particularly the bottom rows of those cigarette bundles, since the duplicative recognition is likely to happen on the cigarettes in the bottom row. The section performing the determination based on the filter end-face gravity center-to-gravity center distance D in the bottom row is referred to as a second determination means of the present invention.

Next, the basic procedure (algorithm) for cigarette shortage determination performed by the cigarette inspection device including the above-described image processor 20 will be described.

Figure 7:
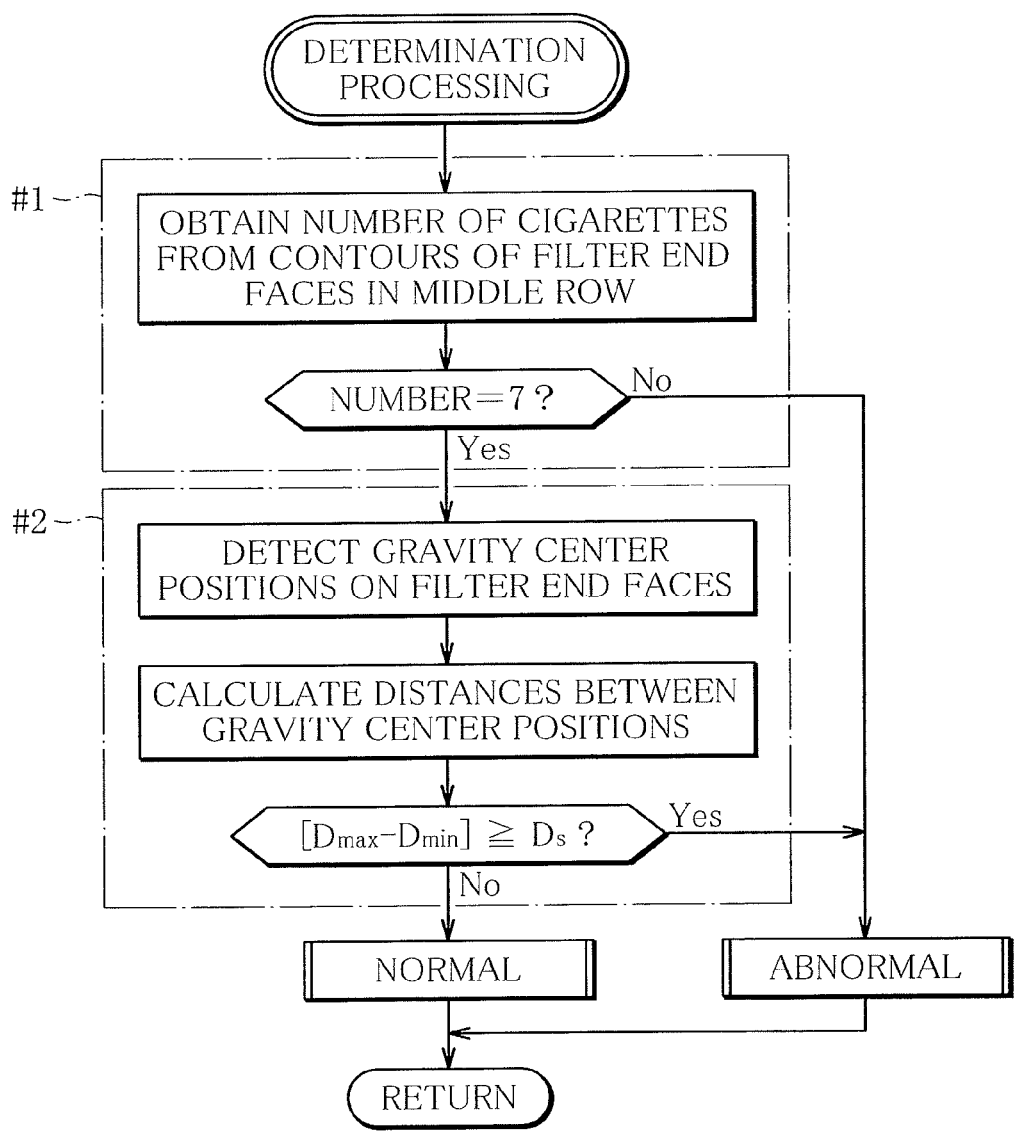
FIG. 7 is a flow chart showing an example of a cigarette shortage determination procedure according to the present invention.

As seen in FIG. 7, the procedure basically comprises two steps #1, #2 in which the first and second determination means are involved, respectively. The present embodiment is configured to inspect cigarette bundles C consisting of three stacked rows of seven, six and seven cigarettes arranged side by side, to detect a shortage of cigarettes which is likely to happen to the bottom row, by focusing on filter end faces in the bottom row in the image of the cigarette bundle.

The determination procedure is started by determining how many cigarettes (filter end faces) are included in the bottom row of a to-be-inspected cigarette bundle, from contours of filter end faces in the image of the cigarette bundle. If, for example the number of cigarettes (filter end faces) included in the bottom row is determined to be six, not the predetermined number seven, it is determined that the cigarette bundle is short of cigarettes, and thus abnormal (step. However, if the number of cigarettes (filter end faces) is determined to be the predetermined number seven, it is not concluded that the cigarette bundle is normal.

The reason is that there is a possibility that although the bottom row includes only six cigarettes for some reason, it is determined that the bottom row includes seven cigarettes due to the contour extraction section 22's duplicative recognition of a cigarette, as mentioned above. The frequency of duplicative recognition greatly depends on the performance of the camera 10.

Thus, if the cigarette bundle has passed the cigarette (filter end face) shortage inspection at step #1, step #2 is performed, where a gravity center position on each filter end face in the bottom row in the image of the cigarette bundle is detected. As mentioned above, prior to the gravity center position detection, contraction processing is performed on the image of the cigarette bundle. When two adjacent cigarettes have filters deformed by pressing, the contours of their end faces may not be recognized in the original image. In the contraction-processed image, however, their end faces are separated from each other, so that a gravity center position on each filter end face can be detected.

On the basis of the gravity center positions on the respective filter end faces, obtained in the image of the cigarette bundle, how many cigarettes (filter end faces) are included in the bottom row can be checked.

Figure 8:
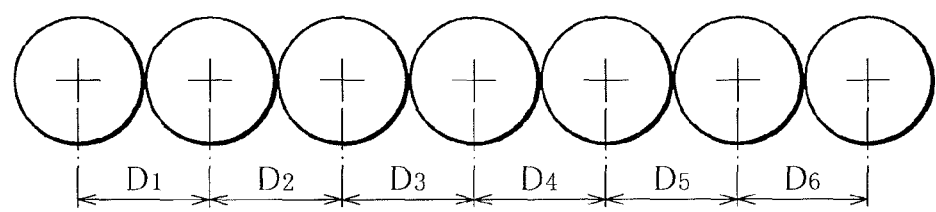
FIG. 8 is a diagram showing the concept of how to detect a shortage of cigarettes on the basis of distances between gravity center positions on filter end faces.

Specifically, as seen in FIG. 8, the distances D1 to D6 between gravity center positions on adjacent filter end faces are calculated, and the greatest and the smallest of the distances are obtained as the maximum and the minimum values Dmax, Dmin of gravity center-to-gravity center distance D. Then, whether or not the difference [Dmax−Dmin] between the maximum and minimum values Dmax, Dmin is greater than or equal to the criterion value Ds, which is preset as described above, is determined (step #2).

Let us suppose that the bottom row consists of the predetermine number seven of cigarettes arranged side by side orderly as shown in FIG. 8. In this case, the difference [Dmax−Dmin] between the maximum and minimum values Dmax, Dmin of gravity center-to-gravity center distance D is practically zero [0], and thus, necessarily less than the criterion value Ds, even assuming the greatest error De possible in the calculated distances D1 to D6. Consequently, it is determined that the bottom row includes the predetermined number seven of cigarettes, and that the cigarette bundle is normal with respect the number of cigarettes.

Figure 9:
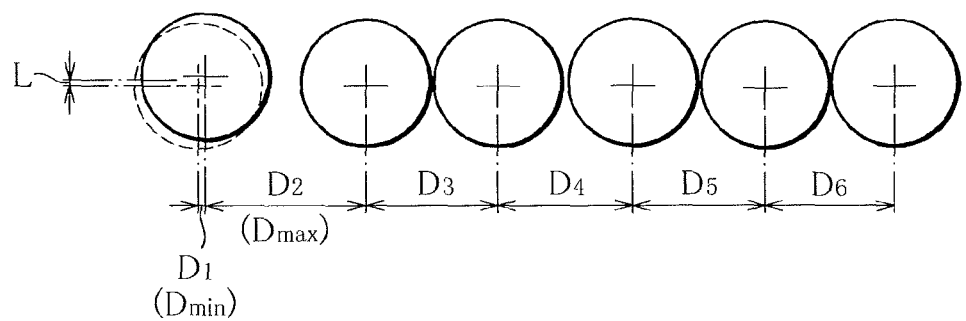
FIG. 9 is a diagram showing an example of how gravity center positions are recognized when the bottom row of the bundle is short by one cigarette.

Let us suppose that although the bottom row consists of six cigarettes, one less than the predetermined number seven, it has been determined that seven cigarettes are included in the bottom row due to the leftmost cigarette having been recognized as two, as shown in FIG. 9. In this case, distances D1 to D6, indicated in FIG. 9, are obtained as distances between gravity center positions, where the distances D1 and D2 are obtained as the minimum and maximum values Dmax, Dmin of gravity center-to-gravity center distance D, respectively, and the difference [Dmax−Dmin] is greater than or equal to the criterion value Ds which is preset to be approximately equal to the filter diameter φ. Consequently, it is determined that one cigarette is missing in the bottom row. Thus, even if it is determined at step #1 that seven cigarettes (filter end faces) are included in the bottom row, it can be determined at step #2 that only six cigarettes are present in the bottom row, or in other words, the bottom row is one cigarette short of the predetermined number seven, and that the cigarette bundle is abnormal with respect to the number of cigarettes.

In sum, the cigarette inspection device according to the present invention is designed to double-check a cigarette bundle. Specifically, even when the number of filter end faces (cigarettes) determined from the contours of filter end faces in the image of a cigarette bundle is normal, the cigarette bundle is subjected to the inspection based on the gravity center position on each filter end face to determine whether duplicative recognition has happened. This increases the reliability of inspection, sufficiently.

Whether there is a shortage of cigarettes is determined from the image showing filter end faces of a not yet packaged cigarette bundle C, using an existing pattern-search inspection algorithm. Those cigarette bundles C which have been determined to be short of cigarettes can therefore be easily removed from the packaging machine, prior to packaging. There is neither the need to introduce a new inspection algorithm into the operating inspection system nor the need to introduce a new image processor. A long-term shutdown of the factory for introducing a new system as well as the costs of introduction can therefore be avoided.

In the described embodiment, when the difference [Dmax−Dmin] is greater than or equal to the criterion value Ds, it is determined that duplicative recognition has happened and that there is a shortage of cigarettes. The image used for this determination may be an image showing filter end faces which is obtained for use in determining, for example whether the filter end faces are soiled or not, when the cigarette bundle C is supplied to the packaging machine. The present invention thus easily realizes a cigarette inspection device having high reliability of detecting abnormal cigarette bundles.

In the described embodiment, image processing is performed on a cigarette row basis, which greatly reduces a load on the processor as well as the time taken for inspection, as compared with when the image processing is performed on a cigarette basis. The cigarette inspection device according to the present invention is therefore very helpful in maintaining the quality of cigarette packs manufactured by packaging cigarette bundles C.

In the described embodiment, only those cigarette bundles which have passed the cigarette shortage inspection based on the contours of filter end faces are subjected to the inspection determining duplicative recognition; the cigarette bundles C which have not passed the shortage inspection are removed from the inspection determining duplicative recognition, leading to increased ease and efficiency of inspection.

The present invention is not restricted to the described embodiment, which can be modified in various ways.

For example, the described embodiment is based on the assumption that a cigarette bundle C is formed of twenty cigarettes. The present invention is however not restricted to cigarette bundles formed of a specified number of cigarettes; it is applicable to cigarette bundles C formed of five or ten cigarettes, for example.

In the described embodiment, whether duplicative recognition has happened is determined by the gravity center-to-gravity center distance D, namely distance between gravity center positions of laterally adjacent cigarettes. The way to determine duplicative recognition is however not restricted to this. The duplicative recognition may be determined on the basis of not only the distance between gravity center positions of adjacent cigarettes of one row but also the distance L between gravity center positions of vertically adjacent cigarettes of two rows. This increases the reliability of determining duplicative recognition.

EXPLANATION OF REFERENCE SIGNS

1 Determination section (first determination means, second determination means)
C Bundle
D Gravity center-to-gravity center distance
Dmax Maximum value of gravity center-to-gravity center distance
Dmin Minimum value of gravity center-to-gravity center distance
Ds Criterion value of gravity center-to-gravity center distance

The invention claimed is:

1. A cigarette inspection device designed to obtain an image showing filter end faces of a bundle of filtered cigarettes arranged side by side with their axes parallel to one another, analyze the image and determine whether the bundle is short of filtered cigarettes, comprising:
   a first determination section which determines how many filtered cigarettes are arranged side by side from contours of filter end faces in the image obtained, and determines whether the bundle consists of a predetermined number of filtered cigarettes, and
   a second determination section which determines whether said first determination section has falsely recognized one cigarette as two,
   wherein said second determination section obtains gravity center positions on filter end faces in the image, and determines whether said first determination section has falsely recognized one cigarette as two, on the basis of distances between gravity center positions on adjacent filter end faces.

2. The cigarette inspection device according to claim 1, wherein said second determination section obtains a difference between the largest and the smallest of the distances between gravity center positions, and if the difference is greater than or equal to a preset criterion value, determines that said first determination section has falsely recognized one cigarette as two, and that the bundle is short of cigarettes.

3. The cigarette inspection device according to claim 1, wherein the cigarette inspection device is designed to inspect a bundle formed of a plurality of alternately stacked rows of n filtered cigarettes and (n−1) filtered cigarettes, the filtered cigarettes being arranged side by side with their axes parallel to one another in each of the rows, wherein
   said second determination section determines whether said first determination section has falsely recognized one cigarette as two, on a row-by-row basis.

4. The cigarette inspection device according to claim 1, wherein said second determination section determines whether said first determination means has falsely recognized one cigarette as two, only when said first determination section has determined that the bundle consists of the predetermined number of filtered cigarettes.

5. The cigarette inspection device according to claim 2, wherein the cigarette inspection device is designed to inspect a bundle formed of a plurality of alternately stacked rows of n filtered cigarettes and (n−1) filtered cigarettes, the filtered cigarettes being arranged side by side with their axes parallel to one another in each of the rows, wherein
   said second determination section determines whether said first determination section has falsely recognized one cigarette as two, on a row-by-row basis.

6. The cigarette inspection device according to claim 2, wherein said second determination section determines whether said first determination section has falsely recognized one cigarette as two, only when said first determination section has determined that the bundle consists of the predetermined number of filtered cigarettes.

7. The cigarette inspection device according to claim 3, wherein said second determination section determines whether said first determination section has falsely recognized one cigarette as two, only when said first determination section has determined that the bundle consists of the predetermined number of filtered cigarettes.

* * * * *